United States Patent [19]

Hattori et al.

[11] Patent Number: 4,638,690
[45] Date of Patent: Jan. 27, 1987

[54] METHOD AND APPARATUS FOR CONTROLLING ELECTRONICALLY CONTROLLED TRANSMISSIONS

[75] Inventors: Toshihiro Hattori, Ayase; Masaki Ishihara, Fujisawa; Makoto Uriuhara, Yokohama, all of Japan

[73] Assignee: Isuzu Motors Limited, Tokyo, Japan

[21] Appl. No.: 546,394

[22] Filed: Oct. 28, 1983

[30] Foreign Application Priority Data

Oct. 30, 1982 [JP] Japan .................................. 57-191244

[51] Int. Cl.⁴ ............................................ B60K 41/18
[52] U.S. Cl. ..................................... 74/866; 364/424.1; 74/870
[58] Field of Search ................. 74/857, 862, 863, 864, 74/865, 866, 471 XY, 473 R, 336 R, 336.5, 335, 870, 871, 868, 869; 180/335, 336; 364/424.1

[56] References Cited

U.S. PATENT DOCUMENTS

| | | | |
|---|---|---|---|
| 4,134,312 | 1/1979 | Iijima | 74/865 |
| 4,226,295 | 10/1980 | Rembold et al. | 74/866 X |
| 4,258,591 | 3/1981 | Eckert et al. | 74/870 X |
| 4,369,676 | 1/1983 | Gaus | 74/870 X |
| 4,391,165 | 7/1983 | Gaus | 74/865 X |
| 4,490,790 | 12/1984 | Shinoda | 364/424.1 |
| 4,493,228 | 1/1985 | Vukovich et al. | 74/866 X |
| 4,499,793 | 2/1985 | Jow et al. | 74/866 |

FOREIGN PATENT DOCUMENTS

| | | | |
|---|---|---|---|
| 83306588 | 1/1984 | European Pat. Off. | |
| 0108572 | 5/1984 | European Pat. Off. | 74/870 |
| 1555170 | 12/1970 | Fed. Rep. of Germany | |
| 2331647 | 1/1975 | Fed. Rep. of Germany | 74/471 XY |
| 2714559 | 10/1978 | Fed. Rep. of Germany | |
| 2738914 | 3/1979 | Fed. Rep. of Germany | |
| 3144845 | 12/1982 | Fed. Rep. of Germany | 364/424.1 |
| 3128266 | 2/1983 | Fed. Rep. of Germany | 74/471 XY |
| 0081256 | 5/1983 | Japan | 364/424.1 |
| 0180866 | 10/1983 | Japan | 364/424.1 |
| 0203256 | 11/1983 | Japan | 364/424.1 |
| 1158800 | 1/1969 | United Kingdom | |

Primary Examiner—Leslie A. Braun
Assistant Examiner—Dirk Wright
Attorney, Agent, or Firm—Staas & Halsey

[57] ABSTRACT

An electronically controlled vehicle transmission has a gear shifting operation which is controlled by determining an optimum transmission gear based on shift map data stored in an electronic control device, a detected vehicle speed and a detected degree of depression and speed of movement of an accelerator pedal. If the accelerator pedal is abruptly depressed while the vehicle is running, such an abrupt depression is detected by a pedal speed detector which produces a signal to cause an electronic control device to interrupt the gear shifting operation. The electronic control device starts the gear shifting operation again after the accelerator pedal depression is stabilized.

10 Claims, 8 Drawing Figures

METHOD AND APPARATUS FOR CONTROLLING ELECTRONICALLY CONTROLLED TRANSMISSIONS

BACKGROUND OF THE INVENTION

The present invention relates to a method of and an apparatus for controlling an electronically controlled transmission for use in an automobile.

Vehicles, typically automobiles, powered by internal combustion engines have a transmission coupled between the engine and driven wheels for effective utilization of output power from the engine. In operation, one of several different gear ratios of the transmission is selected to meet the particular vehicle speed. For example, when the vehicle is to run at a low speed, a larger gear ratio is used.

A transmission system having a hydraulic drive mechanism controlled by a computerized electronic control unit for automatically driving an internal lever which selects transmission gears has been put into use recently. The transmission system has a select actuator for driving the interval lever selectively in a Y direction, and a shift actuator for driving the internal lever in an X direction perpendicular to the Y direction. The computerized electronic control unit has a memory for storing data known as a shift map, representing transmission gears corresponding to automobile speeds and degrees of depression of an accelerator pedal. While the automobile is being driven, the electronic control unit detects the depression of the accelerator pedal at all times and searches the shift map based on the detected pedal depression data for determining an optimum transmission gear. Then, the electronic control unit issues a command to operate the shift and select actuators alternately to select an optimum transmission gear ratio.

The electronic control unit for the electronically controlled transmission operates as follows: While the automobile is running on a flat road at a speed of 50 Km/h with the accelerator pedal depressed 20% of its full stroke, the optimum transmission gear is the top gear (3rd forward-gear position, for example). As the automobile starts running up a steep upgrade, the speed of the automobile drops rapidly. To avoid the speed drop, the driver responds by depressing the accelerator pedal successively by 20%, 30%, 40%, and finally more than 80% of its full stroke. At this time the accelerator pedal moves through a range of 40% of the full depression stroke requiring a gear change from the 3rd to the 2nd gear. The electronic control unit detects the depression of the accelerator pedal and issues a command to the shift and select actuators to shift the transmission from the 3rd gear to the 2nd gear. If, after the transmission has been shifted, the accelerator pedal is still depressed by more than 80% of the full stroke, the electronic control unit detects this depression of the accelerator pedal and issues a command to the shift and select actuators to shift the transmission from the 2nd to the 1st gear. Due to the gear change from the 3rd to the 2nd gear, the speed of the automobile is reduced gradually. Therefore, upon completion of the gear shifting operation, the speed of the automobile has already been reduced to a large extent. The conventional electronic control unit is, consequently, disadvantageous in that the transmission is shifted stepwise from the 3rd to the 2nd to the 1st gear while the shifting operation is being carried out, and any following automobile operation is delayed.

SUMMARY OF THE INVENTION

Accordingly, it is an object of the present invention to provide a method of and an apparatus for controlling an electronically controlled vehicle transmission which prevent a change in transmission gears when the accelerator pedal has been depressed to a large depth and select a transmission gear suited for an accelerator pedal depression and a vehicle speed when the pedal depression is stabilized.

Another object of the present invention is to provide a method of and an apparatus for controlling an electronically controlled vehicle transmission without having automobile operation suffer from any delay caused by the gear shifting operation.

According to the present invention, there is provided a method of controlling an electronically controlled vehicle transmission having an actuator controlled by an electronic control device dependent on driving conditions of the vehicle for changing gear ratios, comprising the steps of monitoring a speed of movement of an accelerator pedal, detecting when the speed of movement of the accelerator pedal exceeds a predetermined value, locking a gear changing operation when the speed of movement of the accelerator pedal exceeds the predetermined value, and effecting the gear shifting operation after the completion of the movement of the accelerator pedal.

According to the present invention, an apparatus is provided for controlling an electronically controlled transmission of a vehicle, comprising a transmission actuator for changing gear ratios in the transmission, an electronic control device for controlling operation of the transmission actuator, an accelerator pedal, means for detecting the speed of movement of the accelerator pedal, means for generating a signal when the speed of movement of the accelerator pedal exceeds a predetermined value, and means for temporarily locking the operation of the transmission actuator controlled by the electronic control device in response to the signal produced when the speed of movement of the accelerator pedal exceeds the predetermined value.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
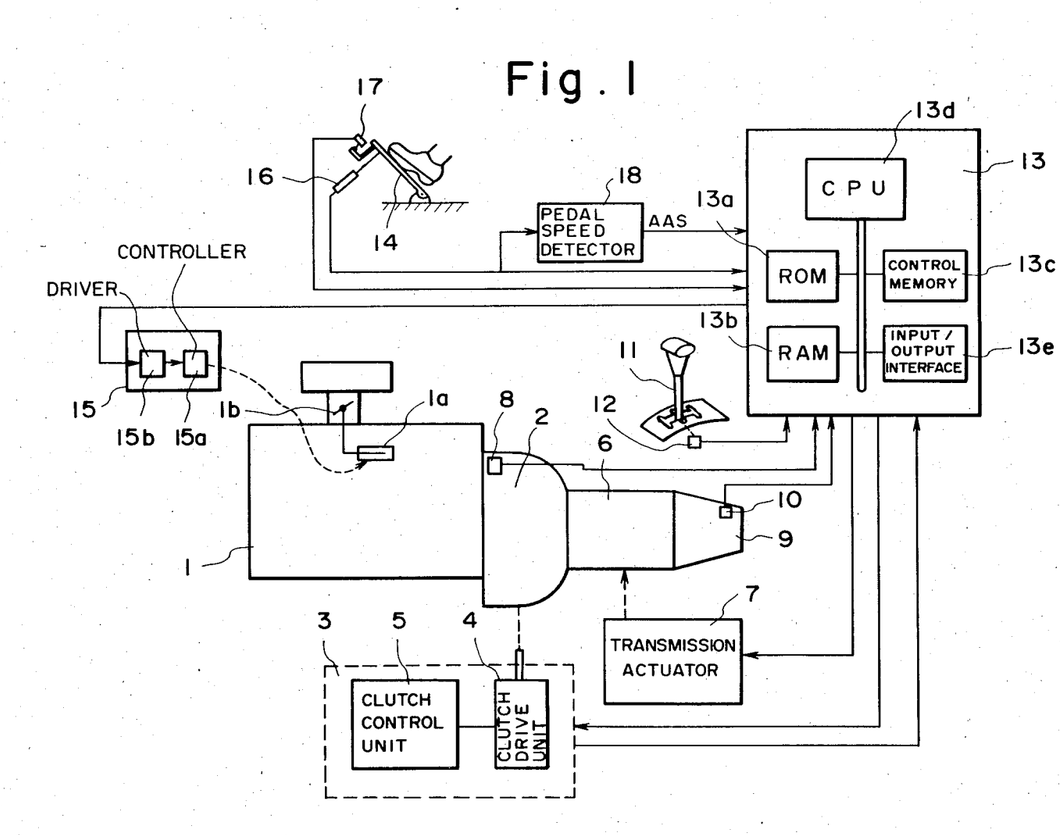
FIG. 1 is a schematic block diagram showing an engine, a transmission, a clutch, and an electronic control device.

FIG. 1 schematically shows in block diagram an engine, a transmission, a clutch, and an electronic control device for the engine, transmission and clutch. A gasoline engine 1 has a throttle actuator 1a operatively coupled to a throttle valve 1b for actuating the throttle valve. A clutch 2 is operatively connected to the engine and actuatable by a clutch actuator 3 composed of a clutch drive unit 4 and a clutch control unit 5. A parallel-shaft gear transmission 6 is operatively connected to the clutch 2 and actuatable by a transmission actuator 7 for changing gear ratios. The rotation of the engine 1 is detected by an engine rotation sensor 8. A wheel driving mechanism 9 is operatively coupled with the transmission 6 and includes a propeller shaft, a universal joint, and other components (not shown). A car speed sensor 10 is disposed in the wheel driving mechanism 9. A drive control lever 11 serves to actuate a position switch 12 which issues a signal to an electronic control device 13. In response to the signal from the position switch 12, the electronic control device 13 delivers a signal, dependent on the position of the control lever 11, to the transmission actuator 7 for selecting a gear ratio of the transmission 6 according to the applied signal. More specifically, when the control lever 11 is in a 1st range, the transmission 6 is controlled to select the 1st gear; when the control lever 11 is in a 2nd range, the transmission 6 is controlled to be automatically shifted between the 1st and 2nd gears; when the control lever 11 is in a 3rd range, the transmission 6 is controlled to be automatically shifted between the 1st, 2nd, and 3rd gears; when the control lever 11 is in a 4th range, the transmission 6 is controlled to be automatically shifted between the 1st, 2nd, 3rd gears, and 4th; when the control lever 11 is in a range D, the transmission 6 is controlled to be automatically shifted between the 1st, 2nd, 3rd, 4th, and 5th gears; when the control lever 11 is in a range R, the transmission 6 is controlled to select the reverse gear; and when the control lever 11 is in a range N, the transmission 6 is controlled to select the neutral gear.

The vehicle also has an accelerator pedal 14, a throttle control unit 15, a potentiometer 16 for detecting the degree of depression of the accelerator pedal 14, an idling switch 17, and a pedal speed detector 18 for detecting the speed of operation of the accelerator pedal 14. The throttle control unit 15 includes a driver 15a for actuating the throttle valve 1b and a controller 15b for controlling the driver 15a. The throttle control unit 15 is responsive to a signal from the potentiometer 16 for controlling the opening of the throttle valve 1b dependent on the depression of the accelerator pedal 14.

The electronic control device 13 comprises a read-only memory (ROM) 13a for storing a sequence program for controlling operation of the engine 1, data for controlling gear changes in the transmission 6, data for controlling actuation of the clutch 2, and other necessary data, a random-access or data memory (RAM) 13b for storing storing the results of arithmetic operations, input data, and other data, a control memory 13c for storing a control program, a central processing unit 13d for effecting arithmetic operations and processing data under the control of the control program and the sequence program, and an input/output interface 13e. According to the present invention, the electronic control device 13 controls engine control parameters such as the rate of supply of fuel to the gasoline engine 1, ignition timing, and EGR (exhaust gas recirculation) to meet engine operating conditions, and, in addition, controls the clutch 2 and the gear changes in the transmission 6. For the clutch and transmission control, the read-only memory 13a stores data for connecting and disconnecting the clutch 2 and data for controlling the gear changes in the transmission 6.

The electronic control device 13 receives signals output from the potentiometer 16, the position switch 12, and the car speed sensor 10 successively through the input/output interface 13e and stores these signals in the data memory 13b. The central processing unit 13 computes and determines an optimum gear ratio in response to the depression of the accelerator pedal 14, the indication by the control lever 11, and the speed of the automobile, which are indicated by the received data. The gear change and clutch control data corresponding to the determined gear ratio are then read out of the read-only memory 13a and supplied through the input/output interface 13e to the transmission actuator 7 and the clutch actuator 3. The transmission actuator 7 and the clutch actuator 3 then operate the transmission 6 and the clutch 2 to effect a desired gear change. The electronic control device 13 carries out such data reception, gear ratio determination, and supplies control data at all times so that the transmission 6 will operate at an optimum gear ratio at all times.

Figure 2:
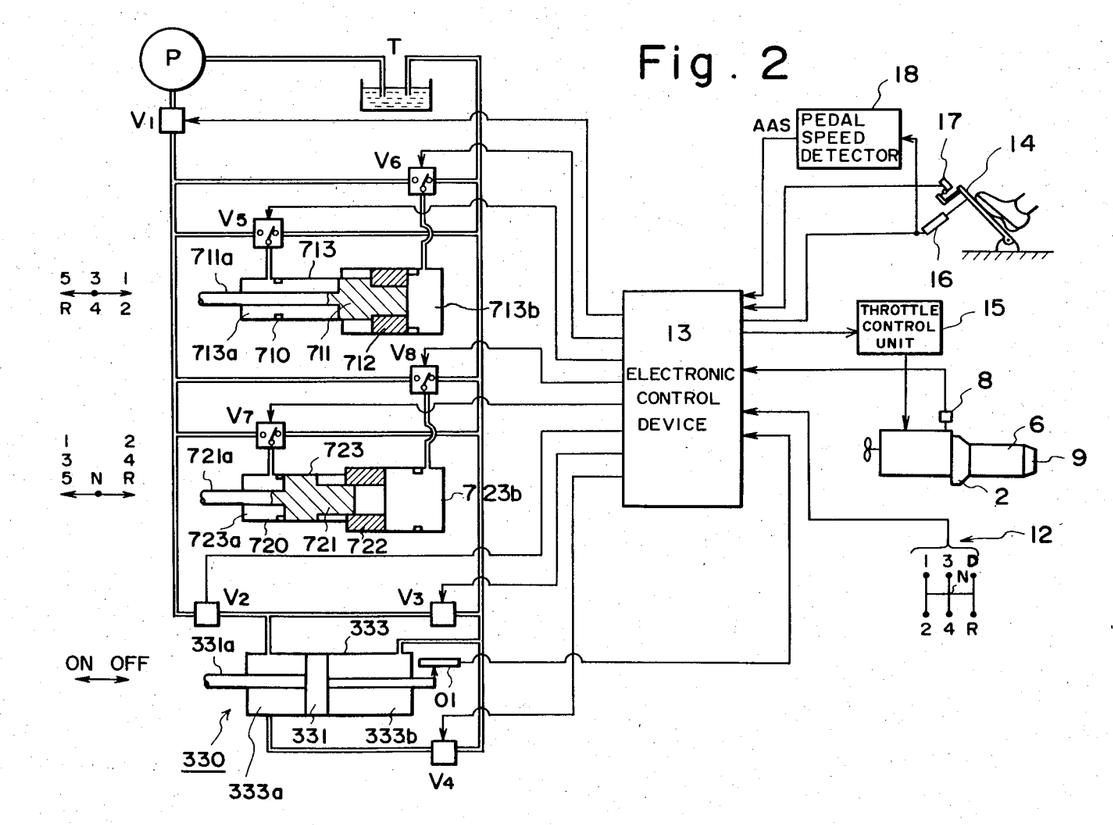
FIG. 2 is a circuit diagram of a hydraulic circuit arrangement of a transmission actuator and a clutch actuator.

FIG. 2 shows a hydraulic circuit arrangement of the transmission actuator 7 and the clutch actuator 3. The circuit arrangement includes a select actuator 710, a shift actuator 720, the clutch actuator 330, switching valves V1 through V4, directional control valves V5 through V8, a pump P, and a tank T. The 1st through 5th gear positions are designated by 1 through 5, the neutral position by N, and the reverse gear position by R. The clutch connecting and disconnecting positions are indicated by ON and OFF, respectively. FIG. 3(B) illustrates the gear positions in greater detail, in particular the three neutral positions N1, N2 and N3.

The select and shift actuators 710, 720 can provide three stop positions, and comprise stepped cylinders 713, 723, respectively, first pistons 711, 721, respectively, disposed slidably in the stepped cylinders 713, 721, and tubular second pistons 712, 722 fitted over the first pistons 711, 721, respectively, and disposed slidably in the cylinders 713, 723, respectively. The first pistons 711, 721 have piston rods 711a, 721a held in engagement with an internal lever (not shown) of the transmission 6. The select and shift actuators 710, 720 are in the illustrated neutral positions when a fluid pressure acts in each of chambers 713a, 713b and 723a, 723b in the stepped cylinders 713, 723 of the actuators 710, 720. When the chambers 713a, 723a are pressurized, the first pistons 711, 721 together with the second pistons 712, 722 are moved to the right (FIG. 2). When the fluid pressure acts in the chambers 713b, 723b, only the first pistons 711, 721 are moved leftward (FIG. 2).

The chambers 713a, 713b in the select actuator 710 are held in fluid communication through the directional control valves V5, V6, respectively, with the pump P (also through the switching valve V1) and the tank T.

The chambers 723a, 723b in the shift actuator 720 are held in fluid communication through the directional control valves V7, V8, respectively, with the pump P (also through the switching valve V1) and the tank T.

The clutch actuator 3 comprises a cylinder 333, a piston 331 slidably disposed in the cylinder 333, and a piston rod 331a having one end connected to the piston 331 and an opposite end connected to an actuator lever (not shown) of the clutch 2. The cylinder 333 has a chamber 333a communicating with the pump P through the switching valves V1, V2 and with the tank T through the switching valve V3 and the switching valve V4 which is controlled to be opened and closed cyclically. The cylinder 333 also has a chamber 333b kept in fluid communication with the tank T at all times.

The piston 331, the piston rod 331a, and the cylidner 333 constitute the clutch drive unit 4, and a positional control potentiometer 01 and the switching valves V2, V3, V4 constitute the clutch control unit 5.

Figure 3A:
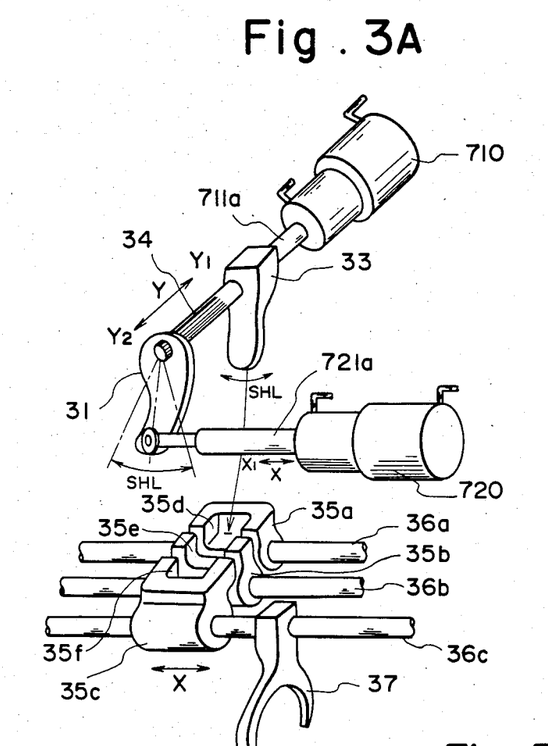
FIG. 3(A) is an exploded perspective view illustrating of a portion of the internal construction of the transmission.
Figure 3B:
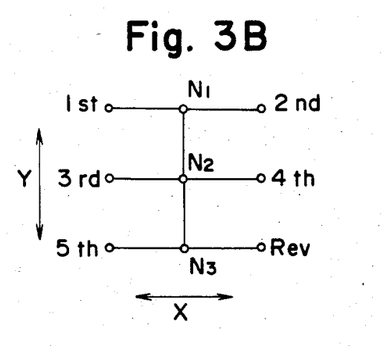
FIG. 3(B) is a diagram showing a pattern of movement of an internal lever of the transmission.

As illustrated in FIG. 3(A), the select actuator 710 and the shift actuator 720 are arranged in mutually perpendicular relationship. The selector actuator 710 includes a rod 711a and an internal lever 33 attached to the rod 711a and movable in a Y direction on movement of the rod 711a in the Y direction. A shift lever 31 is slidably attached to a splined portion 34 at the end of the rod 711a for corotation with the rod 711a, and is movable in the Y direction along the rod 711a. The rod 711a can be turned about its own axis in response to angular movement of the shift lever 31. The shift lever 31 is pivotably joined to the end of the rod 721a of the shift actuator 720. Rod 721a is movable in an X direction perpendicular to the Y direction. Accordingly, when the shift actuator 720 is actuated to move the rod 721a axially, the shift lever 31 is angularly moved to turn the rod 711a of the select actuator 720 about its own axis. The internal lever 33 can therefore be moved in the Y direction by the rod 711a, and turned in an SHL direction by the shift lever 31. The internal lever 33 has a distal end engaging in one, at a time, of slots 35d, 35e, 35f in shift blocks 35a, 35b, 35c fixed respectively to shift rods 36a, 36b, 36c. In response an axial movement of the rod 711a of the select actuator 710, distal end of the internal lever 33 can traverse the slots 35d–35f and is positioned in a desired one of the slots 35d–35f. The angular movement of the shift lever 31 causes one of the shift blocks which is engaged by the internal lever 33 to move in the X direction. A shift fork 37 (only one shown) is mounted on each of the shift rods 36a, 36b, 36c for moving a clutch sleeve (not shown). The movement of a desired one of the shift blocks forces the corresponding shift rod and hence the shift fork to move until the clutch sleeve is actuated, whereupon desired gears are brought into meshing engagement, and the previously meshing gears are separated out of mesh with each other, thereby effecting a gear change. More specifically, the internal lever 33 is movable to three positions in the Y direction by axial movement of the rod 711a of the select actuator 710, and also to three positions in the X direction by angular movment of the shift lever 31 caused by axial movement of the rod 721a of the shift actuator 720. Thus, the internal lever 33 can assume a total of nine positions. One of the shift blocks 35a, 35b, 35c is selected when the internal lever 33 is placed in a corresponding one of the three postions in the Y direction or select dirrection. The selected shift block is moved in the X direction or shift direction when the internal lever 33 is angularly moved to one of the positions in the X direction. The above nine positions correspond to the 1st, 2nd, 3rd, 4th, 5th positions, the reverse position, Rev, and the neutral positions N1, N2, N3, as shown in FIG. 3(B), of a manual change lever. Therefore, the select direction is defined as the direction in which the internal lever 33 can be moved between the neutral positions N1, N2, N3 (the Y direction), and the shift direction is defined as the direction in which the internal lever 33 is movable from the 1st, 2nd, 3rd, 4th, 5th positions and the reverse position Rev to the neutral positions N1, N2, N3, or vice versa (the X direction). The internal lever 33 is movable along the path defined by two partially overlapping "H"s connecting the nine positions in response to the movement of the shift lever 31 in the X direction and the movement of the rod 711a in the Y direction, and can be retained in one of the nine positions at a time. For example, when the 1st gear position is to be selected while the internal lever 33 is in the neutral position N2, the rod 711a of the select actuator 710 is actuated to move the internal lever 33 in the direction of the arrow Y1, as illustrated in FIG. 3(A), and the shift lever 31 is turned clockwise about the rod 711a to turn the internal lever 33 clockwise to move the shift block 35a in the direction of the arrow X1, thereby selecting the 1st gear position.

Figure 4:
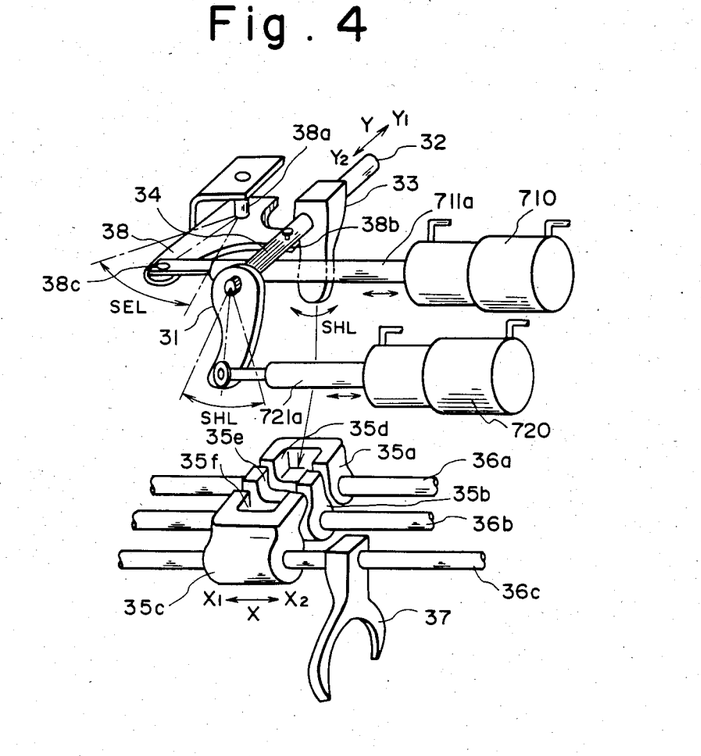
FIG. 4 is an exploded perspective view of a portion of the internal construction of a transmission according to another embodiment.

Although in FIG. 3(A) the select actuator 710 and the shift actuator 720 are arranged perpendicularly to each other, they may be positioned parallel to each other as shown in FIG. 4. More specifically, the rod 711a is separated from a shaft 32 supporting the internal lever 33, and the select and shift actuators 710, 720 are arranged parallel to each other. The shaft 32 and the rod 711a are operatively interconnected by a lever 38 mounted on a vertical shaft 38a for angular movement about the vertical shaft 38a. The lever 38 has ends 38b, 38c pivotably coupled to the shaft 32 and the rod 711a, respectively. With the select and shift actuators 710, 720 thus arranged parallel to each other, they can be alternately actuated to effect gear selection in the manner described above.

Figure 5:
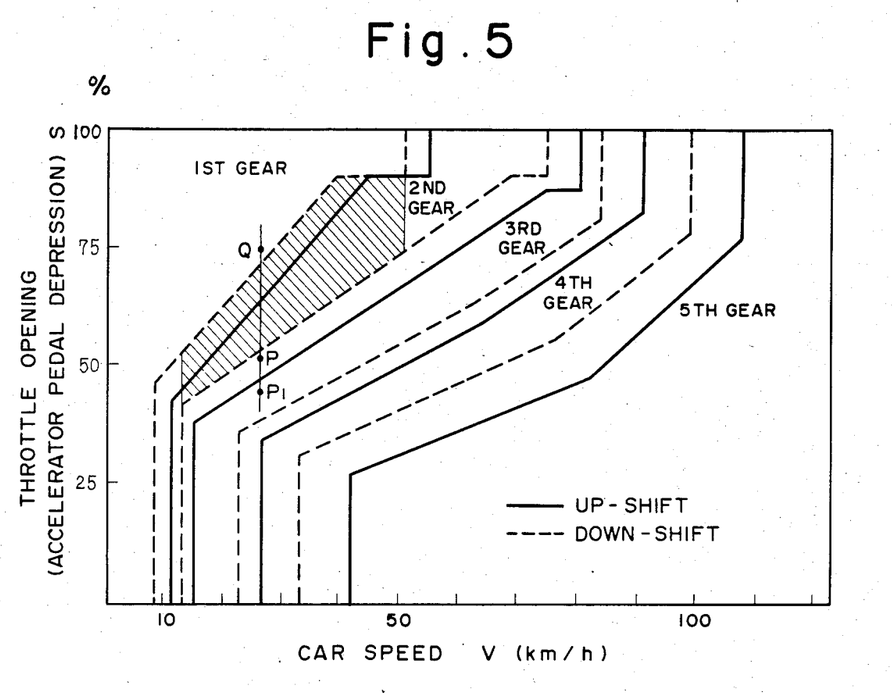
FIG. 5 is a diagram showing a shift map for a transmission having five forward gears.

FIG. 5 illustrates a shift map indicating transmission gear positions with respect to the degree S of depression of the accelerator pedal 14 and the car speed V. Solid-line curves indicate the shifting-up of the gears, and dotted-line curves indicate the shifting-down of the gears. A hatched area represents a zone in the 2nd gear range in which the transmission can be shifted down from the 3rd gear to the 1st gear upon depression of the accelerator pedal 14. Designated as P and P1 are positions in the 3rd gear range close to the 2nd gear area A for the shifting-down of the gears, and Q is a position in the 1st gear range close to the 2nd area for the shifting-down of the gears.

The data on the shift map shown in FIG. 5 is normally stored in the read-only memory 13a in the electronic control device 13.

Figure 6:
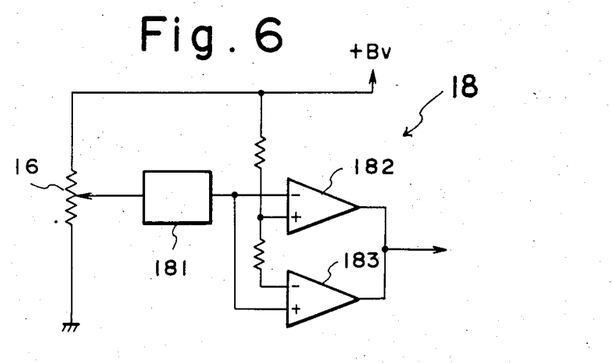
FIG. 6 is a circuit diagram of a circuit for detecting the operating condition of an accelerator pedal.

FIG. 6 shows the pedal speed detector 18 for detecting the speed of operation of the accelerator pedal 14. The pedal speed detector 18 comprises a differentiating circuit 181, and comparators 182, 183 which jointly constitute a window comparator. The differentiating circuit 181 issues a voltage having an absolute value dependent on the speed of depression of the accelerator pedal 14. When the accelerator pedal 14 is depressed at a speed higher than a predetermined speed or released to cause the output voltage from the differentiating circuit 181 to fall within a voltage range set by the window comparator, the pedal speed detector 18 generates a signal AAS. When the accelerator pedal 14 is depressed at an unexpected speed, e.g., when the accelerator pedal 14 is depressed from a substantially released position down to a 100% depressed position in one stroke the differentiating circuit 181 issues a very high voltage. This happens when an electric circuit for the accelerator pedal 14 fails or the automobile is driven under extremely rough conditions. The output voltage from the differentiating circuit 181 then falls outside the voltage range set by the window comparator. The pedal speed detector 18 produces no signal, and no gear change will be effected from the 1st gear to the 5th gear, for example, during one stroke of the accelerator pedal.

Operation of the transmission control system thus constructed will be described.

As an example, the transmission is to be shifted from the 1st gear position to the reverse position Rev, as when the vehicle is to be backed into a garage. In relation to FIG. 2, the select actuator 710 and the shift actuator 720 are set so that the internal lever 33 of the transmission 6 (shown in FIG. 3) is in the 1st gear position. In this position, the switching valve V1 is closed, the switching valves V2, V3, V4 are open, the directional control valves V5, V6, V7, V8 are in communication to the tank T which is vented to atmosphere, and no hydraulic pressure acts on the select actuator 710 or the shift actuator 720. The vehicle is moving slowly with the accelerator pedal 14 depressed slightly. When the accelerator pedal 14 is released to stop and then back the vehicle, the release of the accelerator pedal 14 is detected by the electronic control device 13 which issues a signal to disconnect the clutch 2. In response to this signal, the switching valves V3, V4 are closed, and simultaneously the directional control valves V5, V8 are switched to the pump P. The above valve operation is in preparation for applying the fluid pressure to the chamber 713a in the select actuator 710 and the chamber 723b in the shift actuator 720 when the switching valve V1 is opened, to operate the select and shift actuators 710, 720 into the position of FIG. 2. Then, the switching valves V1, V2 are opened to pressurize the chamber 333a for moving the piston 331 in the clutch actuator 3 to the right (FIG. 2), thus disconnecting the clutch 2. Since the select and shift actuators 710, 720 are fixed in the position shown in FIG. 2 by the foregoing operation, they will not be moved under the fluid pressure acting thereon from the chamber 333b in the clutch actuator 330. When the clutch 2 is disconnected, the switching valve 2 is closed, and the directional control valves V5, V8 are switched to the tank T.

Then, the directional control valve V5 is switched to the pump P, and the directional control valves V7, V8 are also switched to the pump P. This valve operation brings the select actuator 710 into the fixed position, and causes the shift actuator 720 to shift the internal lever 33 from the 1st gear position to the neutral position N1 until the step of the first piston 721 abuts atainst the second piston 722 to stop the rod 721a in the central position.

When the transmission gears are returned back in the neutral position N, the directional control valves V5, V7, V8 are switched to the tank T.

Thereafter, the directional control valves V7, V8 are switched to the pump P to secure the shift actuator 720 in the neutral position N, and at the same time the directional control valve V6 is switched to the pump P to pressurize the chamber 713b to force the second piston 712 against the step of the stepped cylinder 713 and the first piston 711 to the left (FIG. 2). The internal lever 33 is now brought to the neutral position N3 in which the transmission can be shifted to the 5th gear position or the reverse position Rev. The fluid discharged from the chamber 713a in the select actuator 710 at this time cannot move the shift actuator 720 as the shift actuator is in the fixed position.

Upon completion of the above step, the directional control valves V5, V7, V8 are switched again to the tank T.

The directional control valve V7 is then switched to the pump P, and the directional control valve V6 is also switched to the pump P. In response to this valve operation, the select actuator 710 is fixed and the shift actuator 720 is actuated to move the internal lever 33 from the neutral postion N3 to the reverse position Rev. Thereafter, the directional control valves V6, V7 are switched again to the tank T, thereby finishing the gear shifting operation from the 1st gear position to the reverse position Rev.

With the transmission gears in the reverse position Rev, the accelerator pedal 14 is depressed to enable the electronic control device 13 to issue a command to the clutch control unit 5 for opening and closing the switching valve V4 cyclically to gradually release the fluid pressure in the chamber 333a in the clutch actuator 3. The clutch 2 is forced under its own spring resiliency to move the piston rod 331a slowly to the right (FIG. 2) until the clutch 2 is returned to the engaging or connected postion. The vehicle now starts moving slowly backward. When the clutch 2 is fully connected, the vehicle backs at a speed dependent on the degree of depression of the accelerator pedal 14. The switching valve V1 is closed (the switching valve V2 remains closed), and the directional control valves V5, V6, V7, V8 are switched to the tank T while the switching valves V3, V4 remain open, thus relieving the actuators of any fluid pressure.

Figure 7:
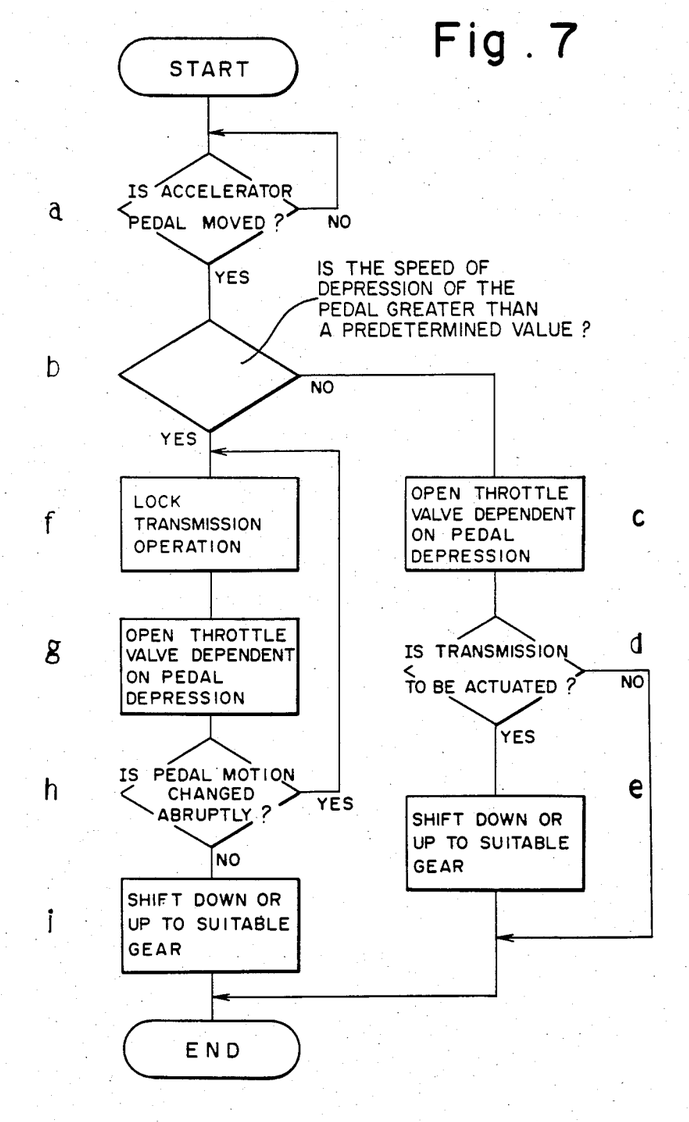
FIG. 7 is a flowchart showing progressive steps of gear shifting operation.

Operation of the transmission control system will be described with reference to the flowchart of FIG. 7.

While the automobile is running, the electronic control device 13 monitors whether the accelerator pedal 14 is moved or not at all times at a step a. If the accelerator pedal 14 is moved, then the program goes to a next step b which determines whether the speed of the depression of the accelerator pedal is greater than a predetermined value. If athe speed of depression of the accelerator pedal is is less than the predetermined value, then the program goes successively through steps c, d, and e for normal driving operation.

If it is determined in the step b that the speed of depression of the accelerator pedal 15 is greater than the predetermined value, such as on kickdown acceleration, then the pedal speed detector 18 detects the abrupt depression and issues a signal AAS to the electronic control device 13, which locks the transmission operation at a step f in response to the signal AAS.

The electronic control device 13 is also responsive to an output signal from the potentiometer 16 for computing the degree of opening of the throttle valve 1b, and issues a command to the throttle actuator 1a to open the throttle valve 1b to a prescribed angle at a step g.

If the motion of the accelerator pedal 14 is stabilized such as when it is brought to a stop, then the pedal speed detector 18 detects the pedal stoppage and no longer issues the signal AAS to the electronic control device 13. The electronic control device 13 immediately picks up a car speed signal and an accelerator opening signal, computes a desired gear position based on the shift map of FIG. 5, and issues a command to the transmission actuator 7 for a gear shifting operation to select the computed gear. When the transmission is to be shifted from the position P1 in the 3rd gear area down to the position Q in the 1st gear area, for example, the transmission is shifted from the position P1 to the position Q in one stroke without passing through the position P in the 2nd gear area.

Although certain preferred embodiments have been shown and described, it should be understood that many changes and modifications may be made therein without departing from the scope of the appended claims.

What we claim is:

1. A method of controlling an electronically controlled transmission of a vehicle during an abrupt depression of an accelerator pedal to accelerate the vehicle, the transmission having an actuator for a gear changing operation controlled by an electronic control device for changing gear ratios, said method comprising the steps of:
    (a) monitoring the speed of depression of an accelerator pedal;
    (b) detecting when said speed of depression of the accelerator pedal exceeds a predetermined value;
    (c) locking a gear changing operation when said speed of depression of the accelerator pedal exceeds said predetermined value; and
    (d) effecting the gear shifting operation after said speed of depression of the accelerator pedal is less than said predetermined value.

2. A method according to claim 1, wherein said transmission comprises a parallel-shaft gear transmission.

3. An apparatus for controlling an electronically controlled transmission of a vehicle, comprising:
    (a) a transmission actuator for changing gear ratios in the transmission;
    (b) an electronic control device, operatively connected to said transmission actuator, for controlling operation of said transmission actuator;
    (c) an accelerator pedal;
    (d) means for detecting the speed of depression of said accelerator pedal;
    (e) means, operatively connected to said detecting means, for generating a signal when said speed of depression of the accelerator pedal exceeds a predetermined value; and
    (f) means, operatively connected to said generating means and said electronic control device, for temporarily locking the operation of said transmission actuator controlled by said electronic control device in response to said signal produced when said speed of depression of the accelerator pedal exceeds said predetermined value.

4. An apparatus according to claim 3, wherein said transmission comprises a parallel-shaft gear transmission.

5. An apparatus according to claim 3, wherein said generating means comprises a differentiating circuit and a comparator.

6. An apparatus according to claim 5, wherein said comparator comprises a window comparator.

7. An apparatus for controlling an electronically controlled transmission of a vehicle, comprising:
    (a) a transmission having an internal lever for changing gear ratios therein;
    (b) a shift actuator, operatively connected to said internal lever, for moving said internal lever in a shift direction;
    (c) a select actuator, operatively connected to said internal lever, for moving said internal lever in a select direction;
    (d) an electronic control device, operatively connected to said shift and select actuators, for controlling operation of said shift and select actuators;
    (e) an accelerator pedal;
    (f) means for detecting the speed of depression of said accelerator pedal;
    (g) means, operatively connected to said detecting means, for generating a signal when said speed of depression of the accelerator pedal exceeds a predetermined value; and
    (h) means, operatively connected to said generating means and said electronic control device, for temporarily locking the operation of said shift and select actuators controlled by said electronic control device in response to said signal produced when said speed of depression of the accelerator pedal exceeds said predetermined value, for selecting an appropriate gear ratio in accordance with the extent of depression of the accelerator pedal when the speed of depression of the accelerator pedal is less than a predetermined value, and for effecting the gear changing operation after the speed of depression of the accelerator pedal is less than a predetermined value.

8. An apparatus according to claim 7, wherein said transmission comprises a parallel-shaft gear transmission.

9. An apparatus according to claim 7, wherein said generating means comprises a differentiating circuit and a comparator.

10. An apparatus according to claim 9, wherein said comparator comprises a window comparator.

* * * * *